May 29, 1956   J. E. GERRY ET AL   2,747,549
COMBINATION HYDRAULIC STEERING AND DAMPING DEVICE
Filed March 24, 1952   3 Sheets-Sheet 1
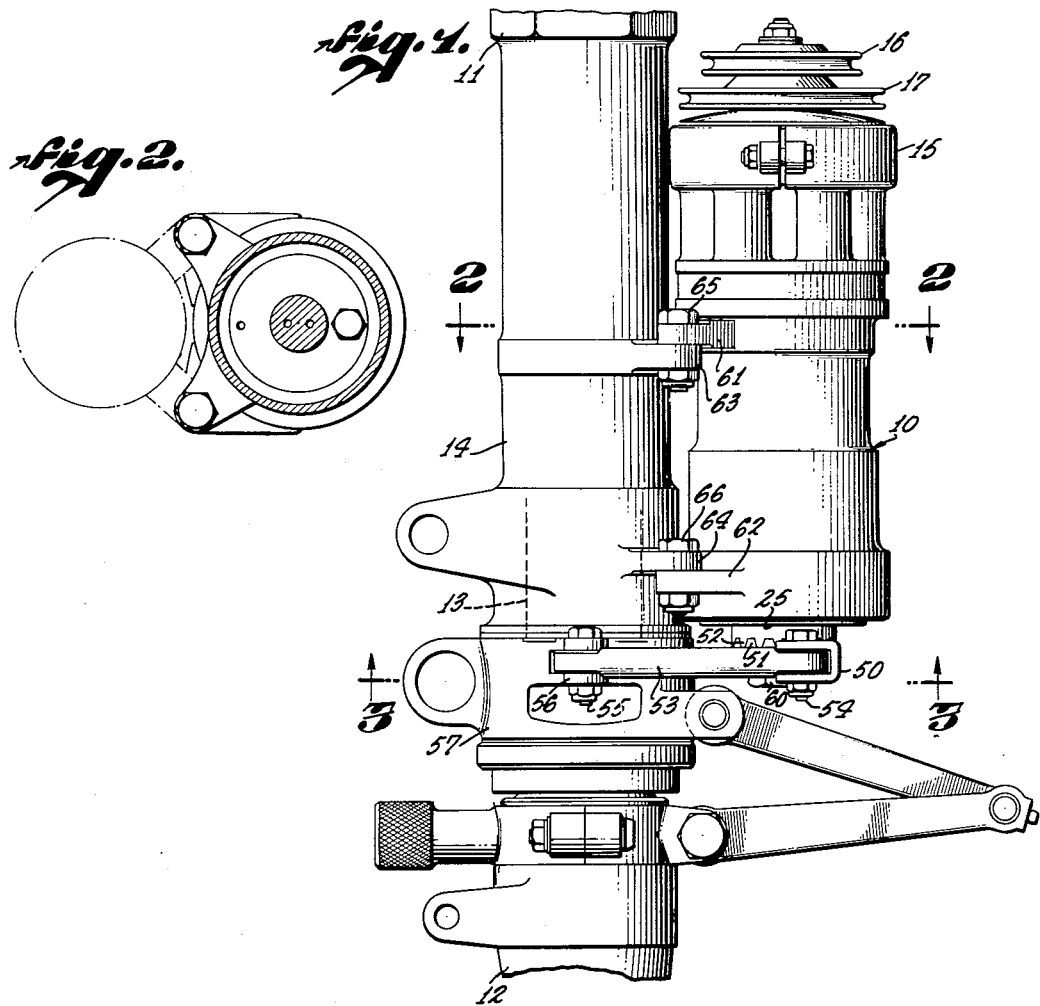
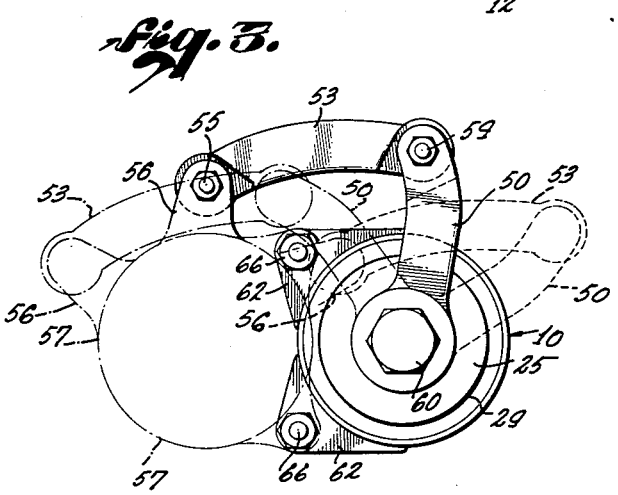
JULIAN E. GERRY &
HOWARD G. MC MANNUS,
INVENTORS.
HUEBNER, BEEHLER,
WORREL & HERZIG,
ATTORNEYS.
BY

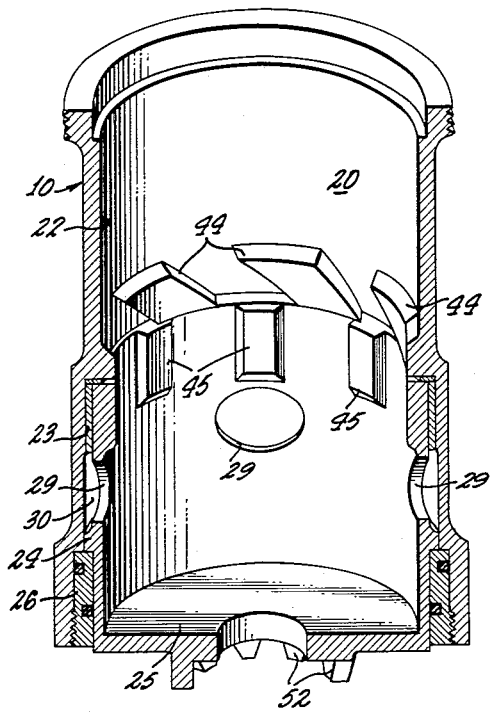
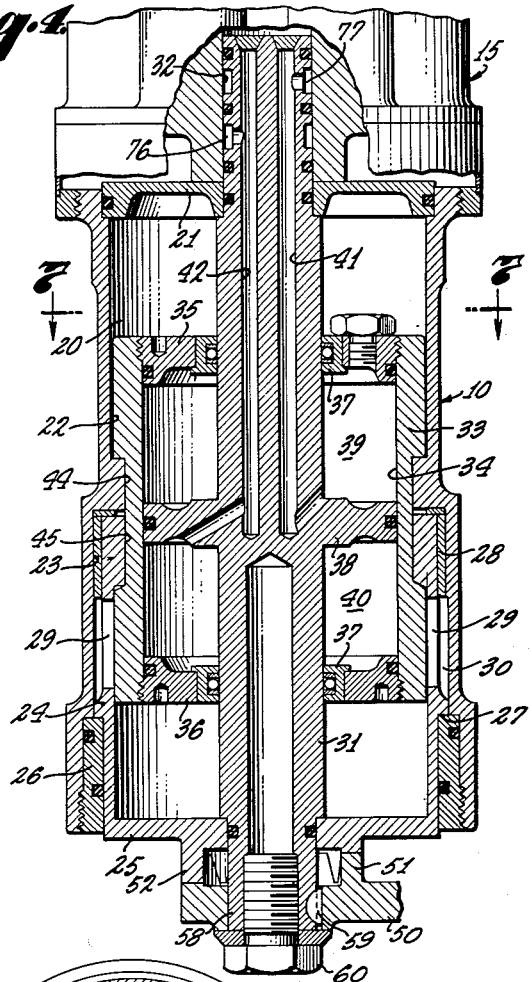
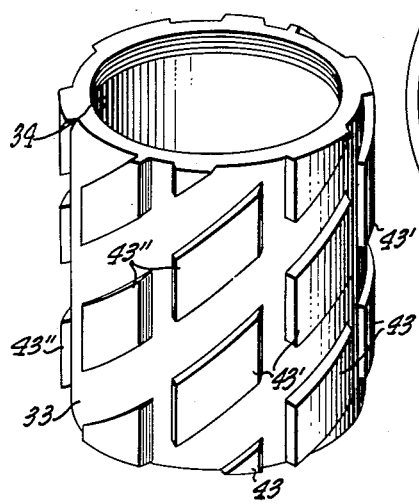
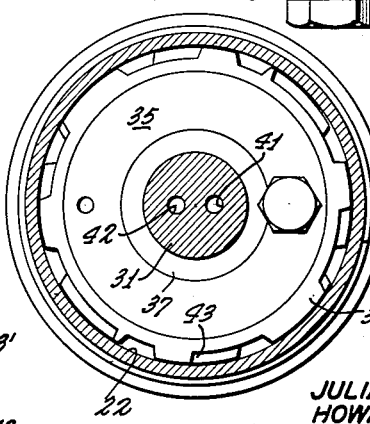
JULIAN E. GERRY &
HOWARD G. MC MANNUS,
INVENTORS.
HUEBNER, BEEHLER,
WORREL & HERZIG,
ATTORNEYS.

May 29, 1956  J. E. GERRY ET AL  2,747,549
COMBINATION HYDRAULIC STEERING AND DAMPING DEVICE
Filed March 24, 1952  3 Sheets-Sheet 3
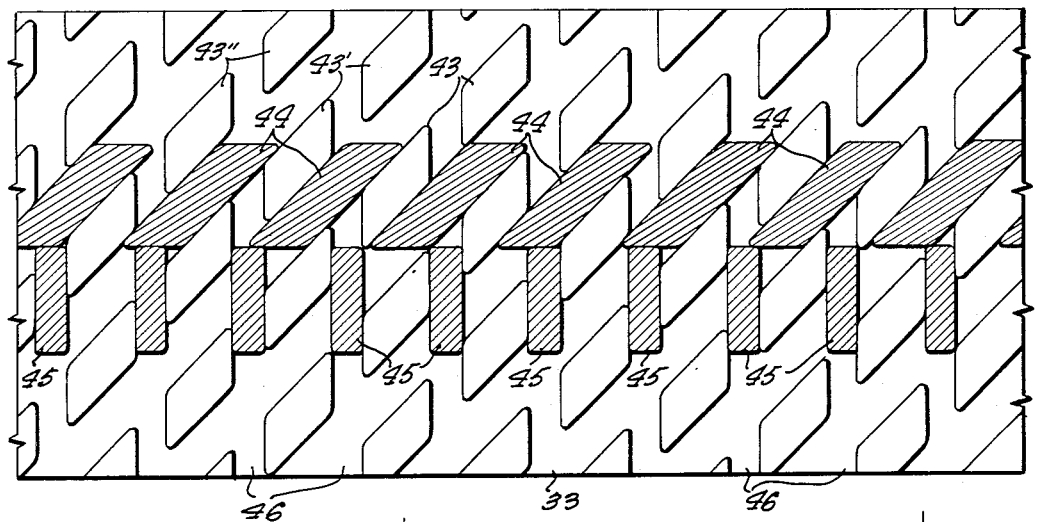
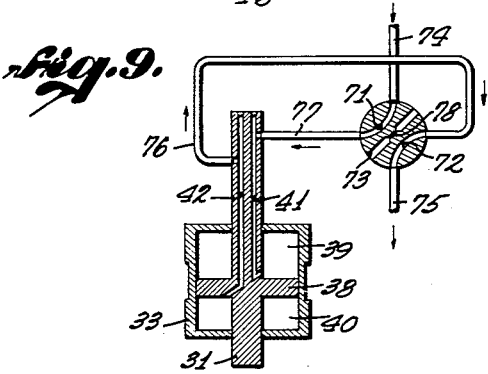
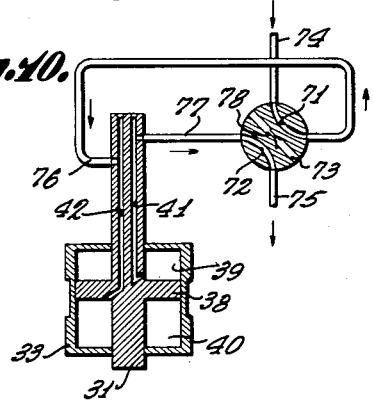
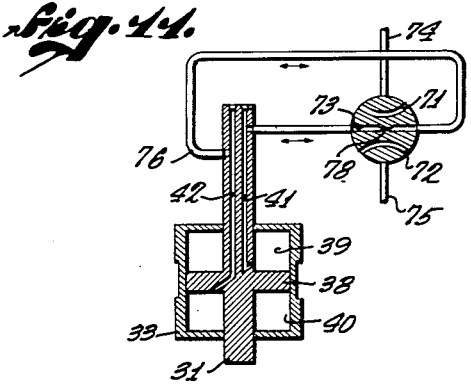
JULIAN E. GERRY &
HOWARD G. MC MANNUS,
INVENTORS.
HUEBNER, BEEHLER,
WORREL & HERZIG,
ATTORNEYS.

United States Patent Office 2,747,549
Patented May 29, 1956

2,747,549

COMBINATION HYDRAULIC STEERING AND DAMPING DEVICE

Julian E. Gerry, Van Nuys, and Howard G. McMannus, Glendale, Calif., assignors to Menasco Manufacturing Company, Burbank, Calif., a corporation of California Application March 24, 1952, Serial No. 278,292

6 Claims. (Cl. 121—38)

The invention relates to hydraulic movements and in particular a hydraulic movement which can be employed as a steering device. More especially the invention in the embodiment herein selected is directed to a hydraulic steering device which can be employed for the third wheel of a tricycle carriage for an airplane. The hydraulic movement is one which has combined with it a hydraulic damping means which is capable of minimizing the so-called shimmy in the third wheel as the aircraft lands on the runway at relatively high speed, the damping device being so connected with the hydraulic steering mechanism that it can be disconnected after the airplane has coasted to taxiing speed so that thereafter the pilot can steer the plane by use of the third wheel to a proper location for discharging passengers and freight.

Although hydraulic mechanisms have been resorted to on occasions for effecting a mechanical motion capable of being used for steering vehicles, for the most part such hydraulic devices have been somewhat complicated in their design and construction to the end that they are not only unnecessarily expensive but also necessitate the employment of mechanisms too heavy in many instances to be entirely satisfactory for use on airplanes. In spite of advances made in the design of hydraulic equipment, these mechanisms heretofore available have not always been sufficiently dependable to be employed where dependability is a primary requisite.

Among the objects of the invention therefore is to provide a new and improved hydraulic movement which is compact to the extent that all of the movements may be confined within a single cylinder of small compass which can be located immediately adjacent the mechanical part which is to be moved.

Another object of the invention is to provide a new and improved hydraulic steering mechanism of a type particularly well adapted for use on caster type wheel mountings which is rugged, which is dependable in operation, and which is adaptable to a great variety of conditions.

Still another object of the invention is to provide a new and improved hydraulic movement which is capable of combining within a single housing the elements of both steering and damping to the end that considerable economy may be effected in weight and variety of parts, the device being so designed that it is self-lubricating and of such simple construction that it lends itself to inexpensive manufacture, ease of assembly and one capable of being readily serviced in a minimum amount of time.

With these and other objects in view, the invention consists in the construction, arrangement and combination of the various parts of the device whereby the objects contemplated are attained, as hereinafter set forth, pointed out in the appened claims and illustrated in the accompanying drawings.

In the drawings:

Figure 1 is a side elevational view of a portion of a tricycle landing gear showing the upper part of a caster wheel mounting and showing the relative location of the combined hydraulic steering and damping mechanism.

Figure 2 is a cross sectional view taken on the line 2—2 of Figure 1.

Figure 3 is a cross sectional view taken on the line 3—3 of Figure 1 looking upward in the direction of the arrows.

Figure 4 is a longitudinal sectional view of the hydraulic steering and damping mechanism.

Figure 5 is a sectional perspective view showing the relationship of certain operating parts as a phantom view.

Figure 6 is a perspective view of a hollow piston employed in the device.

Figure 7 is a cross sectional view taken on the line 7—7 of Figure 4.

Figure 8 is a development showing the relationship of splined elements on the respective different relatively moving parts of the hydraulic device.

Figure 9 is a schematic view of a hydraulic circuit capable of effecting the different steering movements and damping adjustment shown with the representation of a hydraulic valve in a position wherein the device would be steering in a clockwise direction as viewed from above in Figure 9.

Figure 10 is a view of the schematic representation of Figure 9 with the hydraulic valve to steer in an opposite or counter-clockwise direction as viewed from above.

Figure 11 is a view of the schematic representation of Figure 9 with the hydraulic valve in the adjustment it would have for damping only.

In the embodiment chosen to illustrate the device the hydraulic steering and damping mechanism is shown as incorporated in a substantially cylindrical housing 10 which is fastened to a vertical portion of a carriage 11 of the third wheel of a tricycle landing gear commonly employed on certain types of airplanes. The third wheel (not shown) is mounted upon a caster wheel mounting 12, the caster wheel mounting having an upwardly extending caster shaft 13 which is pivotally retained in a caster post 14 forming part of the carriage 11. The hydraulic mechanism in the housing 10 is designed to be controlled by a hydraulic valve means of some acceptable design contained within a hydraulic valve casing 15, the hydraulic valve being subject to manipulation by the pilot in the airplane through pulley wheels 16 and 17 and customary connections thereto of a conventional sort omitted from the drawings in the interest of brevity.

Details of a suitable hydraulic valve adapted to employment with the steering and damping mechanism here disclosed are described in co-pending application Serial No. 275,836, filed March 10, 1952, now abandoned. The arrangement is generally such that, the housing 10 being on a stationary portion of the landing gear, the hydraulic mechanism can be controlled at will by the pilot from the pilot compartment by mechanical means.

As shown in greater detail in Figure 4, the housing 10 is so constructed that it has a substantially cylindrical interior chamber 20 closed at the top by a packing disc 21. A cylindrical wall 22 forming the upper portion of the chamber is somewhat smaller in diameter than a cylindrical wall 23 forming the lower portion of the chamber. In the lower portion of the chamber is a steering drum in the form of a cylindrical sleeve 24 having a bottom 25 forming the bottom of the chamber 20. The cylindrical sleeve is mounted so as to be capable of rotation within the housing 10. A packing gland 26 is provided at the lower end which at the same time forms a bearing for the cylindrical sleeve. For this purpose the sleeve is provided with a shoulder 27 which is adapted to bear upon the packing gland in a thrust relationship. An upper bearing sleeve 28 secures the upper end of the cylindrical sleeve 24 in rotating relationship. It should be noted further that the wall of the sleeve is provided with lubrication passages 29 so that oil from within the chamber can find its way into a space 30 and from there reach the rotating surfaces on the exterior of the sleeve.

Centerably disposed in the cylindrical chamber is a piston rod 31, the piston rod being secured centerably in the packing disc 21 at its upper end and in the bottom 25 of the cylindrical sleeve at its lower end. The upper end of the piston rod continues upwardly within a bore 32 in the casing 15 where suitable packing rings of conventional construction are provided to seal the junction of the exterior of the piston rod with the portions in which it is mounted.

Located within the chamber 20 and surrounding the piston rod is a hollow piston 33. The hollow piston has a cylindrical interior surface 34 extending throughout the length of the hollow piston. At its upper end the hollow piston is closed by a partition 35 and at its lower end is closed by a partition 36, the partitions being provided with suitable packing rings 37 so that the hollow piston can slide with relation to the piston rod 31. Located within the hollow piston and forming a portion of the piston rod at its mid-section is a partition 38 which is adapted to slide with relation to the interior cylindrical surface 34, there being provided suitable packing rings to make a tight sliding seal. The partition 38, together with the partitions 35 and 36, divides the interior of the hollow piston into an upper compartment 39 and a lower compartment 40. A hydraulic passageway 41 extends through the piston rod and communicates with the upper compartment 39. A second hydraulic passage 42 also extends through the piston rod and communicates with the lower compartment 40. It will be apparent therefore that when hydraulic fluid under pressure is sent into the upper compartment through the hydraulic passage 41 and exhausted from the lower compartment through the hydraulic passage 42, the hollow piston will tend to be raised, whereas when the flow of hydraulic fluid is reversed, the movement of the piston will be in the opposite direction.

The object of the mechanism provided in the housing 10 is to make it possible to rotate the cylindrical sleeve 24 by means of moving the hollow piston up and down. To this end an arrangement of diagonal and vertical splines are provided. As shown in detail in Figure 6, the hollow piston 33 is shown in perspective with the upper and lower partitions removed. On the exterior of the hollow piston are sets of obliquely disposed splines 43. It will be noted that the upper and lower edges of the splines are lying in an oblique direction and are parallel one with the other. The splines may be considered to be arranged in sets as, for example, the splines 43 lying in one set, the splines 43' lying in another set, and the splines 43'' lying in a third set. It should be further noted that the end edges of the splines are parallel to each other and lie in a vertical direction such that end edges between splines of one set form a vertical passage which is in vertical alignment with the passage between the splines of the next lower set, and so on. That is to say, the vertical passage is continuous, as indicated at 46, 46, etc.

Extending from the inside wall of the housing 10 into the chamber 20 is a series of splines 44. These splines are likewise pitched on a diagonal and are designed to mesh with the splines 43, 43', 43'', etc., on the exterior of the hollow piston. The meshing of the splines is readily discernible in the development illustrated in Figure 8. Arranged in this fashion it will be clear that when the hollow piston is forced down, it will also be forced to rotate by the interrelationship of the splines 43 and 44, which rotation will be reversed when the hollow piston moves upwardly.

On the interior of the sleeve 24 there is also provided a set of vertical splines 45, these being clearly shown in Figure 5. The vertical splines are designed to slide in the vertical or longitudinal passages formed between end edges of the oblique splines 43, 43', 43'', etc. This relationship is also readily discernible in the development portrayed in Figure 8. Accordingly, when the hollow piston is moved down for example and is caused to rotate as a result of the intermeshing of the splines 43 with the splines 44, the hollow piston will slide with relation to the sleeve 24 but will also cause the sleeve 24 to be rotated at the same rate as the hollow piston is rotated. Rotation of the sleeve 24, also identified as the steering drum, causes rotation of the caster wheel mounting 12 through a suitable steering linkage.

The steering linkage is embodied in part in a link 50 having upwardly extending teeth 51 intermeshing with downwardly extending teeth 52 forming a crown on the lower side of the bottom 25. A second steering link 53 is pivotally secured to the link 50 by means of a bolt 54 at one end. At the other end of the link 53 is a bolt 55 which pivotally secures that end of the link to a bracket 56 integral with a steering collar 57 forming part of the caster wheel mounting 12. Accordingly, rotation of the sleeve 25 shifts the link 50 which in turn shifts the link 53 and hence rotates the steering collar 57 and the caster wheel mounting.

The piston rod 31 has a reduced portion 58 extending downwardly into engagement with the link 50 to which it is non-rotatably keyed by means of a key 59. A nut 60 is used to securely anchor the link 50 to the piston rod and hence to the bottom 25 of the sleeve 24 through the teeth 51 and 52.

As an element in the successful operation of the steering mechanism it should be noted that the housing 10 is of such proportion and size that it can be mounted close to the caster post 14 by employment of brackets 61 and 62 integral with the housing 10 and brackets 63 and 64 integral with the caster post 14 by means of bolts 65 and 66. The longitudinal axis of the housing and operating parts thereof is parallel to the axis of the caster post and the caster wheel shaft 13, the axes being as close together as mechanical connections will permit, thus minimizing the length of the steering links and related parts.

Figures 9, 10 and 11 show schematically a simplified hydraulic circuit and hydraulic valve which could be employed to control the direction of flow of hydraulic fluid in order to operate the device. In Figure 9, for example, the hollow piston 33 is illustrated in its relationship to the piston rod 31 whereon it is adapted to slide up and down and incidentally to rotate together with the piston rod. A hydraulic valve 70 of the rotating style is shown provided with a valve passage 71 on one side, a valve passage 72 on the other side, and a by-pass 73 intermediate the two valve passages. Hydraulic fluid flows through an inlet pipe or passage 74 and is exhausted through an exhaust pipe or passage 75. A hydraulic line 76 communicates with the hydraulic passage 42 and a hydraulic line 77 communicates with the hydraulic passage 41, as also illustrated in Figure 4. The junction of the line 76 with the hydraulic passage 42, for example, is by means of an annular recess constructed along conventional lines to permit the flow to be uninterrupted while the piston rod 31 is permitted to rotate within the hydraulic valve casing 15.

The setting of the hydraulic valve is shown schematically in Figure 9 in a position such that the hollow piston 33 is moving upwardly. As there shown the inlet 74 communicates through the valve passage 71 to the hydraulic line 77, thereby directing hydraulic fluid under pressure through the hydraulic passage 41 into the upper compartment 39 of the hollow piston. At the same time the lower compartment 40 is permitted to exhaust the hydraulic fluid through the hydraulic passage 42, the hydraulic line 76, and valve passage 72, and the exhaust pipe or passage 75. As hydraulic fluid fills the upper compartment 39, it forces the hollow piston upwardly.

When the piston is to be lowered, the hydraulic valve is set in the position illustrated in Figure 10. In that position the flow of fluid is reversed so that hydraulic fluid in the upper compartment 39 is exhausted and hydraulic fluid under pressure from the supply line 74 is admitted to the lower compartment 40, thus filling the lower compartment and moving the hollow piston downwardly.

By reference now to Figures 8, 5 and 6, it will be noted that when the hollow piston 33 is moved upwardly, the splines 43, 43', 43", etc., are forced against the splines 44 which are stationarily positioned on the interior of the housing 10. The force thus generated tends to rotate the splines and the hollow piston 33 in a direction counter-clockwise as viewed from above. As viewed from below, in Figure 3 for example, the direction will be clockwise so that the links 50 and 53 move from the solid line position to the dotted line position there pictured. As previously described, when the hollow piston 53 rotates, the cylindrical sleeve or steering drum also rotates in the same direction which by reason of the interengagement of teeth 52 and 51 cause a corresponding rotation of the link 50, the hollow piston and sleeve being keyed together by means of the vertical splines 45 along which the splines 43 can slide as the hollow piston changes position up or down as the case may be.

Conversely when the motion of the hollow piston is down, pressure of the splines 43, 43', 43", etc., against the stationary oblique splines 44 causes the hollow piston to rotate in an opposite direction or clockwise, as viewed from above. Steering is thus effected in the opposite direction.

When it is desired to use the mechanism as a damper, the hydraulic valve 70 is shifted to the position shown in Figure 11. In this position the upper compartment 39 is connected through the hydraulic passage 41 and hydraulic line 77 to the by-pass passage 73 in the hydraulic valve. In the by-pass passage is a restriction 78 which can be set at a desired amount. The by-pass passage also communicates through the hydraulic line 76 and hydraulic passage 42 to the lower compartment 40. Hence when the airplane lands, for example, at a relatively high rate of speed and the caster wheel mounting 12 tends to shimmy or to be shifted from side to side, a shifting in one direction will tend to rotate the cylindrical sleeve 24 through the steering linkage already described. Tendency of the cylindrical sleeve to rotate in one direction will tend also to rotate the hollow piston in the same direction because of the keying effect of the longitudinal or vertical positioned splines 45. As the hollow piston tends to rotate, it will tend to be raised or lowered, depending upon the direction of rotation, because of the intermeshing of the oblique splines 43, 43', 43", etc., with the oblique splines 44 in the stationary portion of the mechanism, namely, the housing 10. This action will result in shifting the hollow cylinder up or down as the case may be. Restriction to up or down movement is supplied by the restriction 78 in the by-pass passage 73 of the hydraulic valve. The passage of hydraulic fluid, through not blocked entirely, is reduced to such an extent as to limit the up and down movement of the hollow piston to a short throw. This in turn reduces the wobbling back and forth of the caster wheel mounting a corresponding amount and hence minimizes or dampens the shimmy of the wheel.

Operation of the device is further improved by a forced self-lubrication. When the device is initially assembled, the chamber 20 is filled with a suitable lubricating oil. As the hollow piston moves up and down in the chamber 20, the lubricating oil is forced from the lower end of the chamber over the splines into the upper end of the chamber, thus continually forcing lubricating oil to all of the contacting surfaces of the splines. By reason of the presence of the lubricating passages 29, the same body of lubricating oil may be forced into contact with the rotating surfaces between the hollow sleeve 25 and the lower end of the housing 10, thereby also keeping those moving parts properly lubricated. It should be further noted that the moving parts are largely supplied with O-ring seals, thus providing round seals which are highly effective at the high pressures ordinarily encountered in devices of this kind.

There has thus been described a combined hydraulic steering and hydraulic damping mechanism which can be manipulated so as to operate alternatively depending upon landing requirements. The construction and arrangement of parts is moreover such that the motor comprising the hydraulic mechanism can be located in close association with the caster wheel mounting and is further designed so that virtually all hydraulic lines and ports are entirely enclosed, not only making for neat installation, but also providing for protection against the elements, a feature highly desirable when using the hydraulic motion here described in connection with aircraft landing gear. The mounting of the hydraulic unit is also such that it can be very easily affixed to the landing gear or removed therefrom when necessary for replacement or repair.

Moreover, the general principle is such that splines might be variously arranged as, for example, locating the longitudinally disposed splines within the housing and locating the interengaging obliquely disposed splines respectively on the cylindrical sleeve and the hollow piston so that the sleeve can be rotated by the piston. The construction illustrated and described herein has been found more advantageous when the device is to be used with a special hydraulic control in a manner such that rotation of the piston rod 31 can be employed if desired as a signal to the control valve through an appropriate automatic mechanism.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

Having described our invention, what we claim as new and desire to secure by Letters Patent is:

1. In a hydraulic rotating mechanism a tubular housing having a cylindrical chamber, a cylindrical sleeve rotatably secured in the lower portion of the housing, a piston rod mounted centrally within the chamber and secured at one end to the tubular housing and rotatably secured at the other end in said cylindrical sleeve, means forming a pair of hydraulic passages leading into the chamber, a hollow piston slidably mounted on the piston rod and within the chamber and separating the chamber into two lubricant pockets, said piston having end walls and an intermediate wall forming one compartment in communication with one of said hydraulic passages and another compartment in communication with the other of said hydraulic passages, said walls being relatively movable and adapted thereby to change the relative capacity of said compartments, interengaging diagonally directed spline means respectively on the housing and hollow piston, longitudinally directed spline means on the sleeve interengaging spline means on the hollow piston resistant to mutual rotation and permissive of relative longitudinal movement therebetween, said spline means on the housing being adapted to effect rotation of the hollow piston and the sleeve in response to axial movement of the hollow piston, and said pockets being adapted to dispense and receive a fluid lubricant forced over said splines during movement of the hollow piston.

2. In a hydraulic rotating mechanism a tubular housing having a cylindrical chamber therein, a steering drum rotatably secured in the lower portion of the housing, a piston rod mounted centrally within the chamber, said piston rod being fixed at one end thereof against longitudinal movement in the housing and having a rotatable mounting in said one end of the housing and at the other end thereof in said steering drum, a hollow piston slidably mounted on the piston rod and within the chamber having end walls and an intermediate wall forming two compartments, said walls being relatively movable and adapted thereby to change the relative capacity of said compartments, and a hydraulic passage between said compartments having a restriction therein resistant to the flow of hydraulic fluid, interengaging spline means respectively on the drum and the hollow piston resistant to mutual rotation and permissive of relative longitudinal movement therebetween, spline means on the housing interengaging spline means on the hollow piston, said spline means on the hollow piston being rotatable in response to axial movement of the spline means on the hollow piston against the spline means on the housing, and a fluid lubricant in said chamber adapted to be forced over the interengaging spline means in response to a shifting of said hollow piston in the chamber.

3. In a hydraulic movement a relatively stationary member having a cylindrical interior forming a chamber for hydraulic fluid, a first relatively movable member rotatably secured in the chamber, a piston rod centerably disposed in the chamber and mounted in said members, and a hollow piston comprising a second relatively movable member mounted slidably relative to the piston rod and said first identified member, said second relatively movable member having upper and lower compartments and hydraulic passage means communicating respectively with said compartments and having on the exterior at least one set of obliquely disposed splines with the splines separated by longitudinal passages, a set of individual longitudinally disposed splines on the wall of said first relatively movable member disposed each in a longitudinal passage, and a set of individual obliquely disposed splines on the interior of the relatively stationary member adapted to be disposed between and in engagement with splines on the second relatively movable member whereby movement of one of the relatively movable members in its permitted direction of movement effects movement of the other relatively movable member in the direction of movement permitted the latter.

4. In a hydraulic rotating mechanism a relatively stationary member having a cylindrical interior forming a chamber for hydraulic fluid, a relatively movable member rotatably secured in the chamber having lubrication passage means communicating between the chamber and the space between said members, a piston rod centerably disposed in the chamber and mounted in said members, and a hollow piston in the chamber mounted slidably relative to the piston rod and said members, said hollow piston having upper and lower compartments and hydraulic passages communicating respectively with said compartments, said hollow piston having on the exterior a plurality of sets of obliquely disposed splines with splines in each set separated by longitudinal passages aligned with longitudinal passages of the splines of the other sets, a set of individual longitudinally disposed splines on the wall of said relatively movable member with each one of the splines disposed in a longitudinal passage, and a set of individual obliquely disposed splines on the interior of the relatively stationary member adapted to be disposed between and in engagement with splines in adjacent sets on the hollow piston whereby longitudinal movement of the hollow piston effects rotative movement of the relatively movable member.

5. A hydraulic rotating mechanism comprising a tubular housing having a closed cylindrical chamber adapted to confine a lubricating fluid, a fixed closure at one end of the chamber, a cylindrical sleeve having a bottom, said sleeve being rotatably mounted on said housing and forming a closure at the other end of the chamber and a power take-off from the sleeve, a piston rod centerably mounted in said closures and fixed against endwise movement, a hollow piston having closed ends mounted slidably endwise on said rod and within said chamber, an intermediate wall fixed on said rod and within the piston dividing said piston into two separate compartments, means forming hydraulic passages through said rod respectively to said compartments, and means accessible to said lubricating fluid having elements thereof on the walls of said chamber, said piston and said sleeve adapted to change reciprocating motion of said piston to rotating motion of said sleeve.

6. A hydraulic rotating mechanism comprising a tubular housing having a closed cylindrical chamber adapted to confine a lubricating fluid, a fixed closure at one end of the chamber, a cylindrical sleeve having a bottom, said sleeve being rotatably mounted on said housing and forming a closure at the other end of the chamber and a power take-off from the sleeve, a piston rod centerably mounted in said closures and fixed against endwise movement, a hollow piston having closed ends mounted slidably endwise on said rod and within said chamber, an intermediate wall fixed on said rod and within the piston dividing said piston into two separate compartments, means forming hydraulic passages through said rod respectively to said compartments, one set of intermeshing spline means having parts respectively on the housing and the piston and another set of intermeshing spline means having parts respectively on the piston and the sleeve, one of said sets being diagonally disposed and the other set being longitudinally disposed whereby longitudinal movement of the piston is adapted to impart rotational movement to the sleeve.

References Cited in the file of this patent

UNITED STATES PATENTS

| Number | Name | Date |
|---|---|---|
| 448,263 | Rymer | Mar. 17, 1891 |
| 1,232,797 | Hedendahl | July 10, 1917 |
| 1,921,344 | Chilton | Aug. 8, 1933 |
| 2,192,175 | Ballard | Mar. 5, 1940 |
| 2,204,649 | Barnhart | June 18, 1940 |
| 2,383,773 | Chisholm | Aug. 28, 1945 |
| 2,553,632 | Clark | May 22, 1951 |
| 2,613,649 | Diebel | Oct. 14, 1952 |